United States Patent
Rumph et al.

(10) Patent No.: US 6,341,020 B1
(45) Date of Patent: Jan. 22, 2002

(54) ANAMORPHIC OBJECT OPTIMIZED FUNCTION APPLICATION FOR PRINTER DEFECT PRE-COMPENSATION

(75) Inventors: David E. Rumph, Pasadena, CA (US); Eric S. Nickell, Quezon City (PL); Robert M. Coleman, Altadena, CA (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/222,486

(22) Filed: Dec. 28, 1998

(51) Int. Cl.[7] .............................. B41B 1/00; G06K 9/00
(52) U.S. Cl. ...................... 358/1.9; 358/1.14; 382/167
(58) Field of Search .......................... 358/1.9, 1.14, 358/1.11, 1.6; 707/229; 382/112, 103, 181, 291, 309, 167

(56) References Cited

U.S. PATENT DOCUMENTS

| | | | | |
|---|---|---|---|---|
| 4,583,116 A | * | 4/1986 | Hennig et al. | 358/75 |
| 4,700,399 A | * | 10/1987 | Yoshida | 382/17 |
| 4,833,722 A | * | 5/1989 | Morton et al. | 382/22 |
| 5,113,249 A | * | 5/1992 | Yosefi | 358/75 |
| 5,131,058 A | * | 7/1992 | Ting et al. | 382/47 |
| 5,153,748 A | * | 10/1992 | Moyer | 358/443 |
| 5,204,918 A | * | 4/1993 | Hirosawa | 382/41 |
| 5,255,329 A | * | 10/1993 | Tanimizu et al. | 382/8 |
| 5,295,236 A | * | 3/1994 | Bjorge et al. | 395/134 |
| 5,313,570 A | * | 5/1994 | Dermer et al. | 395/131 |
| 5,386,483 A | * | 1/1995 | Shibazaki | 382/22 |
| 5,402,530 A | * | 3/1995 | Boenke et al. | 395/112 |
| 5,440,652 A | * | 8/1995 | Ting | 382/165 |
| 5,528,387 A | * | 6/1996 | Kelly et al. | 358/488 |
| 5,542,052 A | * | 7/1996 | Deutsch et al. | 395/131 |
| 5,581,667 A | * | 12/1996 | Bloomberg | 395/109 |
| 5,613,046 A | * | 3/1997 | Dermer | 395/109 |
| 5,625,703 A | * | 4/1997 | Okuda et al. | 382/112 |
| 5,634,089 A | * | 5/1997 | Kulbida et al. | 395/115 |
| 5,666,543 A | * | 9/1997 | Gartland | 395/788 |
| 5,668,931 A | * | 9/1997 | Dermer | 395/104 |
| 5,704,021 A | * | 12/1997 | Smith et al. | 395/109 |
| 5,835,640 A | * | 11/1998 | Clements | 382/289 |
| 5,875,040 A | * | 2/1999 | Matrasezek et al. | 358/453 |
| 6,005,670 A | * | 12/1999 | Coleman | 358/1.9 |
| 6,081,608 A | * | 6/2000 | Fujii et al. | 382/112 |

\* cited by examiner

*Primary Examiner*—Edward Coles
*Assistant Examiner*—Tia A. Carter

(57) ABSTRACT

Every printing system has characteristic defects which detract from high quality printing. Xerographic printing systems show defects such as banding, mottled colors in large fill areas, trail-edge deletion and starvation where toner concentrations drop at certain color edges, misregistration, and so on. Ink jet printing systems can show ink bleeding, streaking in the direction of head movement, and so on. One approach to reducing printer defects is to refine the electro-mechanics for more precise printing. Another approach which works for predictable defects is to modify the digital data being sent to the printer to pre-compensate for the defect. The prior art does this to a limited extent for individual object types (strokes, fills, images, text, etc.) and for misregistered color edges (trapping). This invention extends the range of edge-related defects that can be both predicted and pre-compensated for. An embodiment of the invention is described which pre-compensates for defects such as trail-edge deletion, starvation, misregistration, halo, etc. by identifying runs of color which meet the criteria likely to cause the effect and applying a function f(edge-distance, object-type) to such runs to modify them appropriately. Both the prediction criteria and the functions applied are anamorphic (the scan direction and process direction are treated differently) and object-optimized (object attributes are taken into account). Further, both prediction criteria and applied correction functions allow user-settable input.

12 Claims, 8 Drawing Sheets

ANAMORPHIC OBJECT OPTIMIZED FUNCTION APPLICATION FOR PRINTER DEFECT PRE-COMPENSATION

BACKGROUND OF THE INVENTION

1. Field of the Invention

The present invention relates to high-quality digital printing in which objects are intermixedly printed, and more particularly, in which a printing process exhibits characteristic, statistically predictable defects which degrade quality. A system-specific and defect-specific function is applied to the digital signal anamorphically (different in the scan and process directions) to change the color or other attributes as a function of distance from an edge to pre-compensate for a defect and thereby increase quality.

2. Description of the Related Art

Digital color printers form a digital image for each of several separations, such as cyan, magenta, yellow, and black. The digital image instructs the printing mechanism of the printer in the amount of each color ink to deposit and the method of deposition at each addressable point on the page.

A digitally imaged page can consist of graphical objects such as text, lines, fills, pictures, etc, all imaged in ways which can be isolated from each other, can abut one another at one or more points, can partially overlap one another, or can completely overlap one another. The resulting printed page or graphic image is therefore made up of a patchwork of shapes representing the graphic objects, some of which are "clipped" by objects imaged later in the succession.

In practice, every color printing system has characteristic defects which can cause subtle problems that detract from achieving the highest possible quality color printing. For example, ink jet printing must handle excessive ink coverage which can cause bleeding or spreading of colors and paper distortion. Xerographic printing contends with a different set of problems which can detract from print quality. Examples are "haloing", in which toner in one separation interferes with toner transfer at the same location in another separation, "tenting", which is toner deletion caused by high toner pile casting a mechanical or electrostatic "shadow" which prevents correct development of abutting toner, trail-edge deletion and starvation, which cause toner deletion at certain edges, or misregistration between two colors. Many of these characteristic problems in printing systems can be traced to undesirable interactions between abutting colors on the page.

Despite known problems, the digital image sent to the printer has in the past assumed a perfect printing mechanism, and provided an ideal image to print. While increasingly sophisticated controls have been added to printing mechanisms to reduce defects and come closer to the perfect printer expected by the digital image, electromechanical defects in any printing system are still common and are to be expected at both the low end where system cost restraints preclude use of expensive controls and the high-end where production speeds challenge existing control systems.

Recent work has begun to look at modifying a digital image in advance in order to pre-compensate for expected problems in a printer. The work may be divided into two groupings. A first grouping of prior art does "object-based compensation", which predicts and pre-compensates for printing problems unique to each object type (text, fill, image, etc.). A second grouping of art does "trapping compensation", which predicts and pre-compensates for only one printing problem: misregistration between two abutting colors.

The first (object-based) grouping deals with isolated objects only; it does not look at problems caused by interactions or adjacencies between colors or objects on the page. Pre-compensation for printing problems is based purely on individual objects being printed, such as text, fill, or picture, without reference to other adjacent objects. Different object types have different predictable printing problems. For example, large uniform color fills can contain visible mottle in what should be smooth color, because the random noise of the print mechanism causes tiny variations in the amount of color put on the page. Text can show rough or fuzzy edges. Images can show unnatural colors. In order to pre-compensate for each special problem, the type of image processing to be done is changed as each different object type is processed for printing. This object-specific rendering pre-compensates for expected predicted printing problems by using different processing for different image types.

For example, when a large color fill is being prepared for imaging, it is possible to switch to a "quieter" halftone that will not show mottle so much. Similarly, if text is being printed, processing which emphasizes sharp edges to overcome limitations in the printer's resolution is chosen. Graphics such as charts and graphs should have color processing which emphasizes bright, saturated colors even in printers of limited gamut, while pictures should be rendered with halftones that have a greater number of available tone values and color correction that emphasizes natural colors.

U.S. Pat. No. 5,634,089 to Kulbida et. al., provides background information on a digital processing method that differentiates among, for example, sampled images and text, and uses tags to process them differently so that sharp edges may be preserved in text while a fuller set of tone values is preserved in pictures.

U.S. Pat. No. 5,704,021 to Smith et. al., describes another system which automatically detects certain object types and changes the image processing accordingly so as to produce a better printed image.

U.S. patent Ser. No. 09/012,651 to Rumph, et. al., describes a more complete system called Object Optimized Rendering which can include hardware-assist for speed and compression, object tags that can be specified by the user or generated automatically and carried throughout the software and hardware image processing system, and even includes object-based measurement feedback to dynamically adjust color correction on an object type basis. This system, in addition to looking at object types as a guide to optimized rendering, also looks at object parameters such as the size of a fill in determining the types of rendering to do.

The second (trapping) grouping of prior art is more limited in scope in that it attempts only to pre-compensate for a single printer defect caused by adjacent colors: misregistration. If a printer misregisters between separations, an thin unwanted white or color line occurs when certain adjoining colors don't abut perfectly. This second group of inventions doesn't care about individual object types or a large range of printer defects as the first (object-based) grouping does. Instead, this group of prior art simply looks at the edge between two color areas, attempting to predict when two abutting colors could cause a thin line problem if the printing system misregisters. The solution used is to generate a fixed-width, constant color fill (a "frame" or "trap") whose color and position is calculated with various methods from the two abutting colors, and to superimpose that new digital signal with the original signal to produce prints that show the misregistration problem less.

For example, the method of Taniguchi, described in U.S. Pat. No. 4,931,861, finds the border between abutting or overlapping colors using logical operations, shrinks one of the color borders, and defines a "linkage" portion as a frame or trap to be superimposed at the border between the two colors.

The method of Yosefi, described in U.S. Pat. No. 5,113,249 uses a set of automated rules as the basis for deciding, for each pair of abutting or overlapping colors, whether or not to create a frame, and, if so, the constant (fill) color to use and the position of the created frame. Yosefi describes rules to follow after finding an edge and knowing the two colors. There are 24 rules based on the two colors. Once the frames are made, they are combined with the original data to print an image having reduced defects.

U.S. Pat. No. 4,583,116 to Hennig et. al describes a trapping process that evaluates the weighted separations on both sides of an edge in order to determine which separation most contributes to the contour. The separation determining the contour is left unchanged. A constant color fill is constructed in a trap zone by replacing the remaining separations in that color with the corresponding separations of the adjacent color.

U.S. Pat. No. 5,131,058 to Ting et. al. converts a raster to an edge-based "outline" representation. Then the outlines are expanded or contracted and the resulting image is rerasterized and merged with the original bitmap.

U.S. Pat. No. 5,295,236 Bjorge, et. al. describes starting from a PDL file, rasterizing and analyzing the result for edges, generating traps (frames) between edges of appropriate colors, and merging those traps into the original file by converting the trap rasters to PDL commands which are inserted into the original PDL file.

U.S. Pat. No. 5,204,918 to Hirosawa assumes vector data as input, describing the contours (edges). Contours are selectively modified to create two supplemental contours, offset at a specified distance from the original contour. A new color is computed for the entire offset region. The maximum (or minimum) density of the two sides is used in the correction region, and the correction region is filled with that density and used as a frame or trap between the two edges.

U.S. Pat. No. 5,402,530 to Boenke et al. uses object terminology as in the first (object-based) group of inventions, but belongs in this grouping because it only uses each object's color and edge information to efficiently determine abutting color objects needing a trap region.

Similarly, U.S. Pat. No. 5,666,543 to Gardand and U.S. Pat. No. 5,542,052 to Deutsch et. al. identify edges between two colors in vector form and construct trap zones as PDL commands.

U.S. Pat. No. 5,542,052 to Deutsch, et. al assigns a relative darkness to each separation, with black being the darkest separation, cyan and magenta being middle darkness, and yellow being lightest. Then, a trap vector is drawn in a color which is derived from the two colors abutting each side of the edge.

U.S. Pat. No. 5,313,570 to Dermer, et. al. takes either raster or PDL input, and creates an intermediate, vector-based form that describes all the boundaries between two colors in the entire page. Trapping operations are applied to those boundaries to assign them the correct color, extent, and position, and the resulting traps or frames are overlaid onto the original image. The trapping rules themselves are independent of the process of finding and tracking the edges.

U.S. Pat. No. 5,668,931 to Dermer describes trapping rules. The overall concept is to have a set of evaluation methods, and for each candidate trap, let each of the evaluation methods decide whether it is an optimum trap. Each method ranks all of the candidate traps, and then the traps are scored, using the weighted sum of the rankings. In this way some evaluation methods are more likely than others. Candidate traps colors are derived from the two abutting colors on each side of the current edge being considered. The resulting traps are overlaid on the original image.

U.S. Pat. No. 5,613,046 to Dermer describes a user interface allowing the display of an image, selection of any color pair, and modification of the trapping behavior in terms of position or color. It also allows display of the effect of any of the 16 possible misregistrations on the selected color pair with or without the current trapping applied, and to iterate through the possible modifications, applying several possible traps to decide which is best. Users may specify the shape of the trap stroke, its position relative to the boundary between two colors, and a single fill color to be used.

U.S. Pat. No. 5,440,652 to Ting describes a process to find an edge and follow it, building a secondary edge a predetermined distance from the primary edge. The secondary edge will be used as the other side of the trap region. The secondary edge distance and the color of the region between (the trap zone) is determined by reference to a set of rules for color pairs.

U.S. Pat. No. 5,386,483 to Shibazaki discusses creating additional regions (frames) on boundaries between regions in the original image. The image is segmented into regions, each of a constant color. Each such region is assigned a region number, and a lookup table is used to store the correspondence between region number, and colors, including both cmyk, and rgb. RGB is used by the operator supervising the process with a display and mouse. The data is then run-length encoded, using runs of color table indices. The algorithm is multi-pass. On the first pass, an eight-neighbor window is used to form a pair of "frame" regions along each color boundary. On subsequent passes, a four-neighbor set is used to extend the frame region. Finally, a color is assigned to each new region thus formed.

U.S. Pat. No. 5,241,396 to Harrington restricts its frame to correcting misregistration problems for "rich" black (composed of cyan, magenta, yellow, and black separations). In these cases, the cyan, magenta, and yellow colors can (if misregistered) show beyond the black border, producing colored, fuzzy edges. The technique described creates a frame of single-black color (black only ink) at the edge by processing the raster such that the black separation images are eroded and then ANDed with each of CMY. The original black is then used as the black separation, producing the rich black on the interior and a black-ink-only frame at the edge.

Similarly, U.S. Pat. No. 4,700,399 to Yoshida finds edges and uses a different UCR along the edges from elsewhere to allow rich black without getting color bleeding along the edges of black objects. Thus colors are kept away from edges of black text by eroding the CMY content at the edge to produce a frame with less or no non-black color.

By contrast, the current invention combines both object and color information to predict and correct a wider range of adjacency problems in a novel way. Unlike the group one (object-based) inventions above which use object information to predict individual object printing problems, the current invention uses object information to help predict and solve object-adjacency printing problems. Unlike group two (trapping) inventions above which only correct for misregistration, the current invention significantly extends the range of adjacency problems that can be detected and corrected. Detection of a larger number of adjacency problems is made possible by including not just color information in predicting adjacency problems but also object information such as object type, object size in the scan and process directions, rendering intent, and other relevant object parameters. Pre-compensation/correction of a larger number of adjacency printing problems (beyond simply misregistration) is made possible by using a novel approach different from the simple trapping solution of adding a uniform-width, constant-color frame between two adjacent colors. Instead, a function is applied to an object edge that can change both its color and rendering hint anamorphically (that is, differently in the process or scan directions) as a function of the distance from the edge.

Thus, the current invention has four elements that go beyond the prior art.

First, in attempting to predict printing problems, the current invention goes beyond the prior art in that it does not look simply at adjacent colors as in the prior art. Instead, it looks for problematic adjacent objects (fills, text, sweeps, images, etc.), with predicted problems caused not only by colliding colors but also colliding attributes such as rendering intent (e.g., two different halftones adjacent to each other) or size in each direction (e.g., some printing problems only occur with objects greater than a certain size in a certain direction).

Second, in attempting to correct a predicted printing problem, the invention goes beyond the prior art in that it is able to apply a different solution in the process direction (down the page) or the scan direction (across the page). This is important because many, if not most, printing problems are asymmetric. Even misregistration, the focus adjacency problem of the prior art, generally is more severe in one direction than the other because misalignment along the scan is caused by different mechanisms than misalignment down the page. The current invention is able to respond to that asymmetry by applying its solutions anamorphically (differently in the scan and process directions).

Third, in attempting to correct a predicted printing problem, the invention goes beyond the prior art in that it can effect a change not only in the color of an edge but in its attributes such as rendering intent as well. This is important because an edge with two different rendering intents (resulting, for example, in different halftones being applied) can create printing problems even if the edge colors will not cause misregistration problems.

Fourth, in attempting to correct a predicted printing problem, the invention goes beyond the prior art in that it does not simply add a uniform-width, constant-color frame at an edge. Instead, it applies a function to the region near an edge which can change any of its attributes (color, rendering intent, etc.) as a function of the distance from the edge. This is important because it allows the system to solve more effectively a wider range of printing problems. For example, a xerographic printing problem called trail-edge deletion can occur when a color fill with sufficient size in the process direction is printed. At the lower process-direction edge, the toner is often depleted, resulting in a lighter color at the edge. This printing problem cannot be solved with a prior art frame or trap. However, by applying a function which changes the density of the color near the edge as a function of the scanline distance from the edge, the problem may be successfully pre-compensated for by the current invention. Note that the function is anamorphic: only process direction edges are modified. Even with the problem of misregistration, applying a function anamorphically to an edge can allow a subtler solution which might be seen as having the effect of a non-constant color, variable width frame different for each process or scan direction run of color, something not suggested by the prior art.

OBJECTS AND SUMMARY OF THE INVENTION

One object of the present invention is to provide a method for predicting when a printing problem is likely to occur based on adjacent colors and/or object attributes such as rendering intent, size, or extent in scan or process directions.

Another object of the present invention is to provide a method for correcting/pre-compensating for a predicted printing problem which can apply a different solution in the process direction (down the page) or the scan direction (across the page), in order to better address the majority of printing problems which are asymmetric (different in the scan and process directions).

Another object of the present invention is to provide a method for correcting/pre-compensating for a predicted printing problem which can effect a change not only in the color near an edge but in its attributes such as rendering intent as well. This allows an edge with two different rendering intents (resulting, for example, in different halftones being applied) to be detected and corrected if necessary even if the edge colors are deemed to be compatible.

Another object of the present invention is to provide a method for correcting/pre-compensating for a predicted printing problem which can apply a function to the region near an edge to change its attributes (color, rendering intent, etc.) as a function of the distance from the edge. This allows a wider range of printing problems to be corrected that cannot be solved with a prior art frame or trap.

To achieve the foregoing and other objects and to overcome the shortcomings discussed above, a digital color printing method and system is provided which analyzes adjacent runs of pixels to identify potential printing problems, using information of the adjacent runs of pixels such as the colors, rendering intents, size, and object type. Having predicted a set of potential printing problems, a method is provided to pre-compensate for the problems by applying functions to the identified problem runs of pixels which are anamorphic with respect to direction on the page, and which can modify various attributes of the pixels (color, rendering intent, object type, etc) as a function of distance of each pixel from the identified edge.

By applying such a function to the pixels near an edge, a zone can be created around an edge which effectively blocks or masks a variety of potential printing problems to increase overall image quality.

BRIEF DESCRIPTION OF THE DRAWINGS

The invention will be described in detail in reference to the following drawings in which like reference numerals refer to like elements and wherein.

DETAILED DESCRIPTION OF A PREFERRED EMBODIMENT

The following notation will be used below to designate the two important directions in printing. The letter "S" will be used to designate the Scan direction (the direction of the scanlines); that is, the direction the laser beam or ink jet Scans across a page. The letter "P" will be used to designate the Process direction (the direction orthogonal to S); that is, the direction the printing Process moves down the page as the laser scans each succeeding line.

Figure 1:
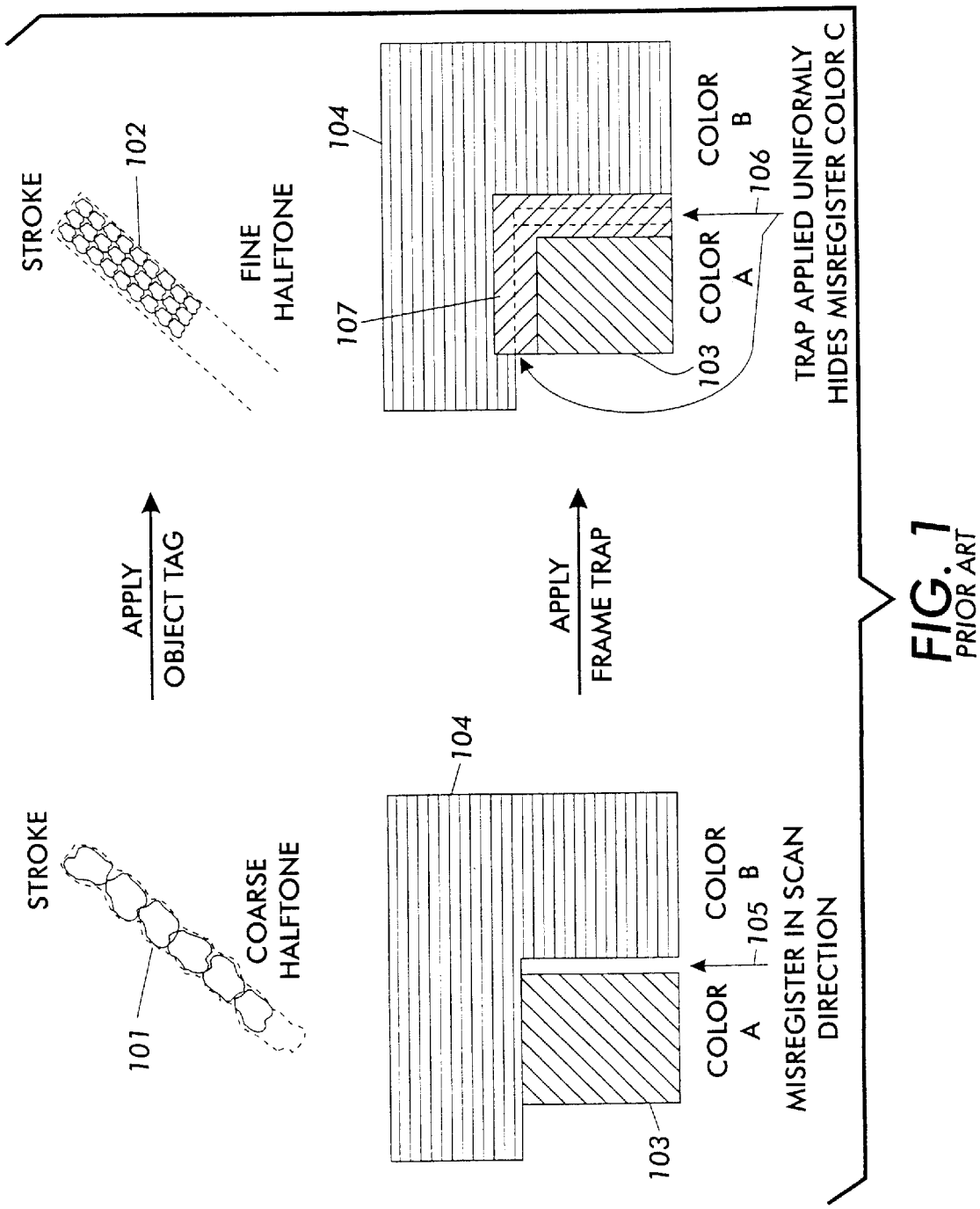
FIG. 1 shows examples of printing problems that can be predicted with known pre-compensations applied in the prior art.

FIG. 1 shows two examples of the types of printing problems currently addressed by the prior art.

First shown is a stroke 101, which looks ragged when rendered with a normal coarse halftone. If the stroke is detected with its object tag, and is rendered instead with a fine halftone, the edges are much sharper as shown by stroke 102. The rendering intent associated with the object type "stroke" generally would indicate that it is more important to preserve edge sharpness than to maintain color fidelity. Thus, a halftone is chosen which has fewer available color levels but which is consequently smaller and able to provide better edge sharpness. This is an example of pre-compensating single objects by applying individual object tags.

A second example is shown in FIG. 1 of pre-compensating in the prior art for a predicted printing problem between two colors. In this case, Color A 103 and Color B 104, if misregistered, will show an objectionable thin white line 105 between them along the vertical edge. To compensate, the prior art applies a uniform width, constant color trap Color C 106 to all the edges between Color A 103 and Color B 104. The result hides the vertical thin white line 105 but in this example adds unnecessary color along the horizontal edge 107 of Color A and B, because that edge 107 lies in a direction where misregistration does not normally occur in the printing process of this example and would therefore not need to be covered with Color C 106.

Figure 2:
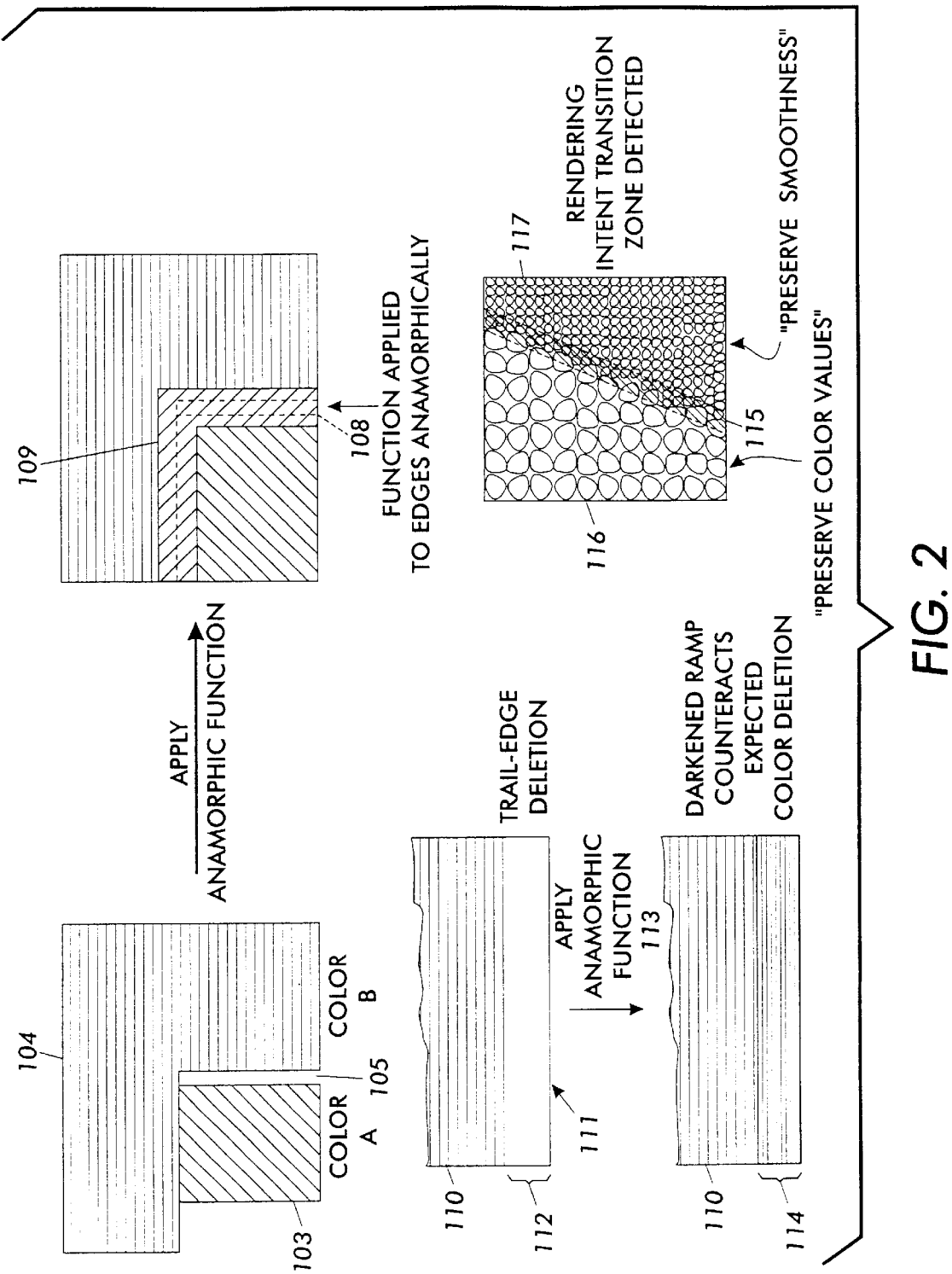
FIG. 2 shows examples of printing problems that can additionally be predicted and pre-compensations applied in the current invention.

FIG. 2 shows three examples of printing problems which are able to be detected and pre-compensated for by the invention which cannot be solved by the prior art.

In the first example in FIG. 2, Color A 103 and Color B 104 are abutting as in FIG. 1. A thin white vertical line 105 is predicted as in FIG. 1. Unlike the prior art, the invention applies a function anamorphically (differently in the Scan and Process directions) to the edges to change the edge color as a function of the distance from the edge and the direction of the edge. As a result, a color 108 is applied to the vertical edge whose color value may vary by distance from the edge, and a different function resulting in a different color 109 is applied to the horizontal edge, resulting in a much thinner variance of color along that edge, since misregistration is not predicted to be as severe in that direction.

In the second example in FIG. 2, a problem is detected which is unable to be detected or solved in the prior art. The problem is called trail-edge deletion, and it occurs in some printing systems whenever there is a color fill 110 which is sufficiently large in the process direction and sufficiently wide in the scan direction and which terminates on a process direction edge 111. In these cases, the ink or toner can sometimes fade out at the lower edge, producing an objectionable lightening of color in a region 112 along that process-direction edge. The invention finds two criteria which the prior art cannot find. First, the prior art only looks for color transitions. The invention by contrast collects bands of scanlines in order to locate wider context printing problems. In this case, the invention first finds fills of color 110 which meet the height and width criteria in both the process and scan directions. Second, the invention finds a process direction edge 111 whose total ink content varies sufficiently across the edge, a situation which can trigger trail-edge deletion. When the problem is detected, the invention applies a function 113 to the process direction edge which changes the intensity of color in the runs leading up to the edge 114 in a way which counteracts the expected deletion of color. For example, the invention might gradually increase the color content as a function of distance to the edge so as to counteract the expected drop-off of color. The actual function applied to the runs as they approach an edge is derived experimentally and varies depending on the printer.

In a third example in FIG. 2, a transition is detected which is not detected by the prior art. The prior art looks for color transitions at an edge which might cause misregistration problems. In this third example in FIG. 2, a transition 115 between region 116 and 117 is detected, and it is a transition not in color but in rendering intent. Region 116 is being rendered with a large halftone that has many color levels because its rendering intent is "preserve color values". Region 117 is being rendered with a special very quiet tint halftone, and probably with a different color transform, because its rendering intent is "preserve smoothness" (i.e., attempt not to show mottle). Because the current invention maintains tags for each run which include attributes other than color such as object type, rendering intent, and in certain cases attributes such as object size, the invention is able to detect a much wider range of printing problems. Just as two incompatible colors might misregister, so two incompatible rendering intents might cause edge problems because of transitions in halftone, for example, or transitions in color transforms such as undercolor removal. As in the previous example, the invention is able to apply a function at an edge to change the appropriate attribute as a function of distance from the edge, so as to achieve a smoother transition.

Figure 3:
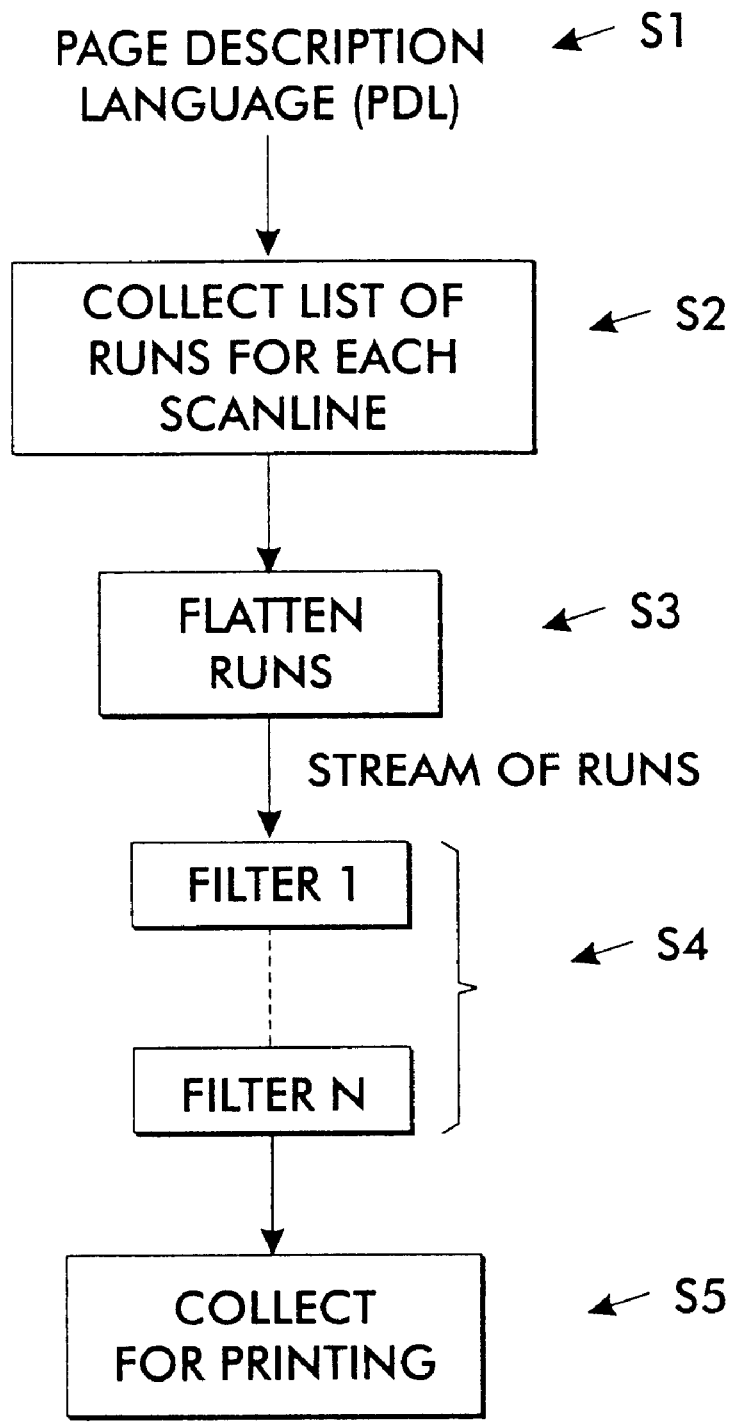
FIG. 3 shows the functional blocks of the color imaging system within which a preferred embodiment of the invention is constructed.

FIG. 3 shows an overview of the high-quality color imaging system within which a preferred embodiment of the current invention runs. The imaging system prepares pages for printing with the following steps:

1) In step S1, a page description language is received which contains instructions giving the location, shape, color, attributes, etc of printable objects on the page.

2) In step S2 the imaging system collects, for each scanline on a page, the runs of color which define the objects on that scanline, Each collected run includes a length, a color, tags identifying the source object type, and other salient parameters to aid in optimal rendering.

Figure 4:
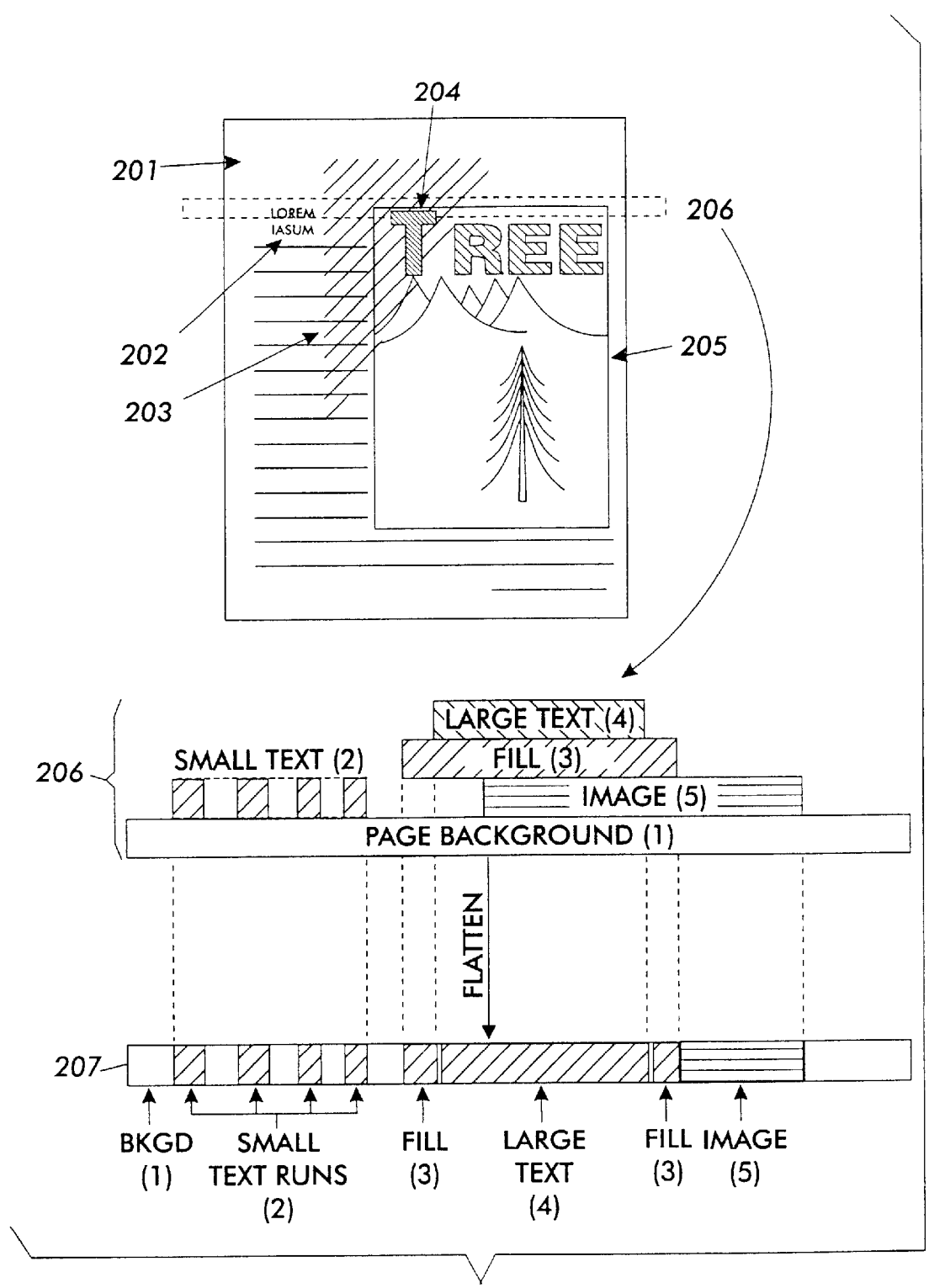
FIG. 4 shows a sample page containing objects of different type, with a single magnified scanline showing overlapping runs being "flattened" to a single stream of runs making up a scanline of data.

3) In step S3 the runs are "flattened" from overlapping, layered runs to "flat runs" that do not overlap by identifying at each point in each scanline which is the "on top" run. The process of collecting overlapping tagged runs and flattening them to a single stream of non-overlapping runs is represented in FIG. 4. FIG. 4 shows a page containing the background of the page 201, small text 202, a triangle shaped fin 203, large text 204, and an image 205. A single scanline 206 is expanded to show the way in which these various objects overlap on that scanline. Below, the same scanline is shown flattened 207, with only the run which is "on-top" now represented in flattened scanline 207.

4) Returning now to FIG. 3, in step S4 the stream of flat runs is sent to a series of "filters" which can operate in an ordered chain on individual or grouped flat runs in one or more scanlines to modify them before printing.

5) In step S5 the filtered runs are merged into the page data for printing.

In the context of the above described high-quality color imaging system, a preferred embodiment of the current invention may be implemented as one or more flat-run filters described in step S4 above. As will be described in greater detail below, the filter or filters which implement the invention first collect a band of scanlines containing flat runs, analyze those bands of flat runs to identify patterns where printing defects are predicted to occur, and modify the runs by applying functions to pre-compensate for the predicted defects. The system has user-settable parameters such as the horizon of interest in both Process (P) and Scan (S) directions (that is, the S and P distances within which printing problems will be detected), settings that balance speed vs accuracy, and settings which specify the ordered list of changes to apply to process or scan-direction edges when found.

The preferred embodiment was implemented with runs, because by definition a run is a group of pixels with the same color and tag, and the end of a run automatically signals a color or tag change where an adjacency problem might occur. It was judged that that approach should work more quickly than a pixel-based system, which has to operate on each pixel in turn and which increases in processing time with the square of the resolution as the resolution increases. Working with runs should also avoid the computational intensity of a vector-based edge identification system. However, it is clear that while the following description of a preferred embodiment is run-based, the invention described could be implemented in a pixel-based or vector-based system as well.

In greater detail, the invention operates as follows:

For review, as shown in FIGS. 3 and 4 the overall color imaging system within which the invention operates interprets an incoming page description language and reduces it to a list of runs for each scanline. It then "flattens" this list of runs by identifying for each portion of each scanline the "on-top" run. This creates a display list consisting of a sequence of runs for each scanline, where the run length, color, and rendering intent cumulatively paint the objects to be rendered on the page. In this particular system, a run has a start position, a length, and information about the object from which it derived, including such possible items as color, type (stroke, text, fill, etc.), and parameters such as stroke width, etc. From this information other information can be derived, such as a rendering hint saying how best to render that particular run (e.g., "preserve edges", "preserve smoothness", etc.). After flattening, the imaging system sends an ordered stream of flat runs to a chain of filters, which is able to modify the "ideal" runs for a variety of reasons, including pre-compensating for printing defects.

Figure 5:
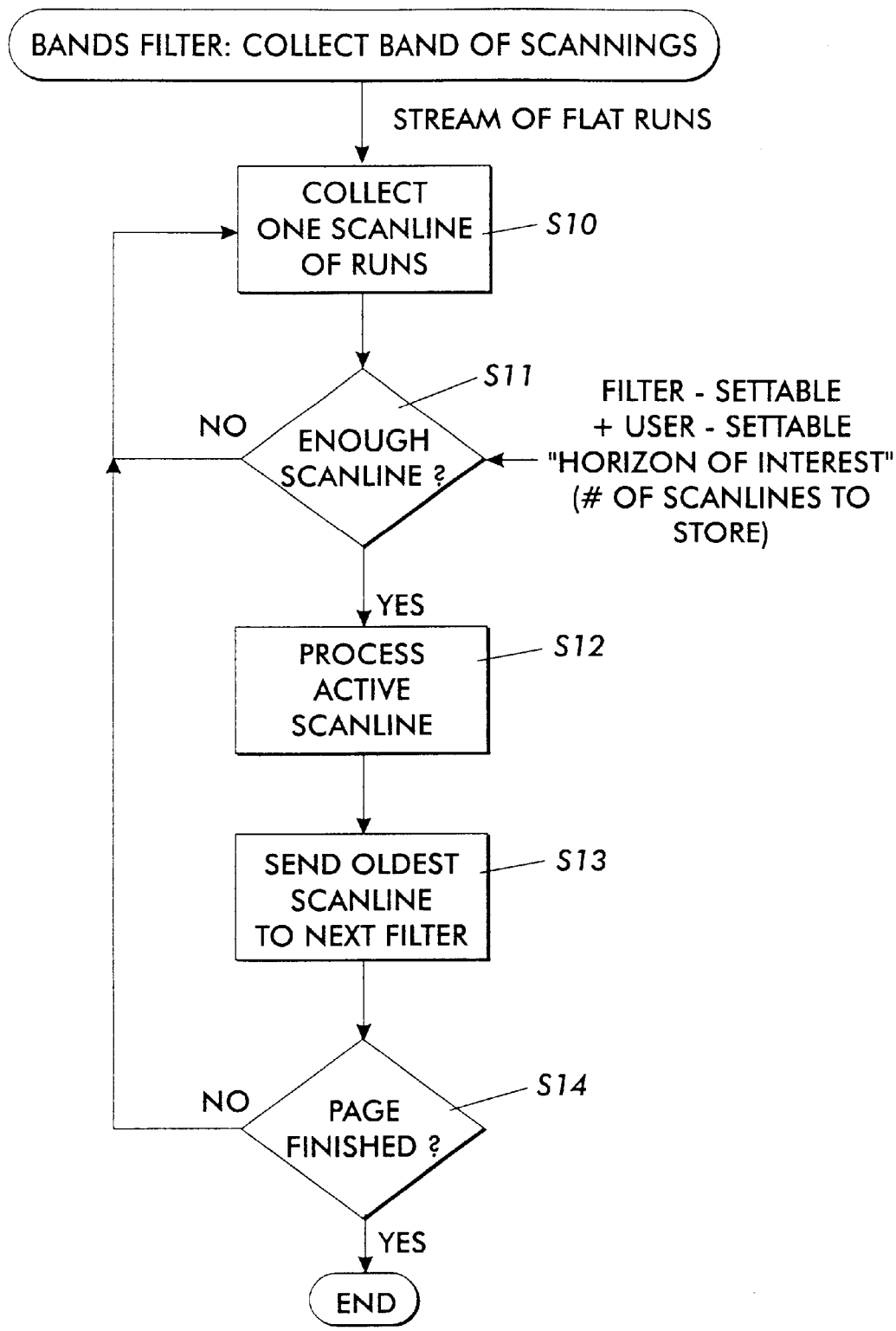
FIG. 5 shows the steps used in the invention to collect a band of scanlines for processing.

As shown in FIG. 5, the first filter provided by the invention is a "bands" filter. In step S10, the bands filter captures the stream of flat runs until a scanline is stored. In step S11, the number of scanlines to store (the "band-size") is input as a user-settable option or (for automatic operation) by the filters of the filter chain; it is derived from knowing how far away to look (the "horizon") for potential printer defect problems for a particular printer. For example, if trail-edge deletion can be prevented by detecting color adjacencies up to 3 scanlines above or 1 scanline below, then a band-size of 5 might be used (i.e., 1 "active" scanline to process+the 3 scanlines above+the 1 scanline below=5 scanlines).

If enough scanlines have not been collected for adequate prediction of printing problems, the bands filter returns to step S10 for further collection. If enough scanlines of runs have been collected, the filter continues to step S12 where the "active" scanline is processed. For example, in the example given in the paragraph above, the "active" scanline is number 4 out of 5 scanlines, with 3 scanlines above and 1 scanline below. Processing an active scanline is described in detail below.

Once the active scan has been processed, in step S13 the oldest scanline is passed down the filter chain to the next filter, the other scanlines propagated up, and in step S14 if the page is not finished, control returns to step S10 where a new scanline of runs is captured and stored. In this way, each scanline in turn is processed as part of a band of scanlines, and the band marches down the page processing each scanline of runs with its adjacent scanlines in turn. (Special processing is needed for the beginning and the end of a page.) At the end of the page, after processing the last scanline, step S14 ends the bands filter activity.

Processing the Active Scanline:

In general, the processing of an active scanline involves identifying and analyzing each point along the scanline where a color or attribute change occurs on ANY of the scanlines in the band. This is because we are looking for any potential edge conflicts that might lead to a printer defect within the horizon of interest (within the band).

Again, the letter "S" will be used to designate the Scan direction (the direction of the scanlines); that is, the direction the laser beam or ink jet Scans across a page. The letter "P" will be used to designate the Process direction (the direction orthogonal to S); that is, the direction the printing Process moves down the page as the laser scans each succeeding line.

Figure 6:
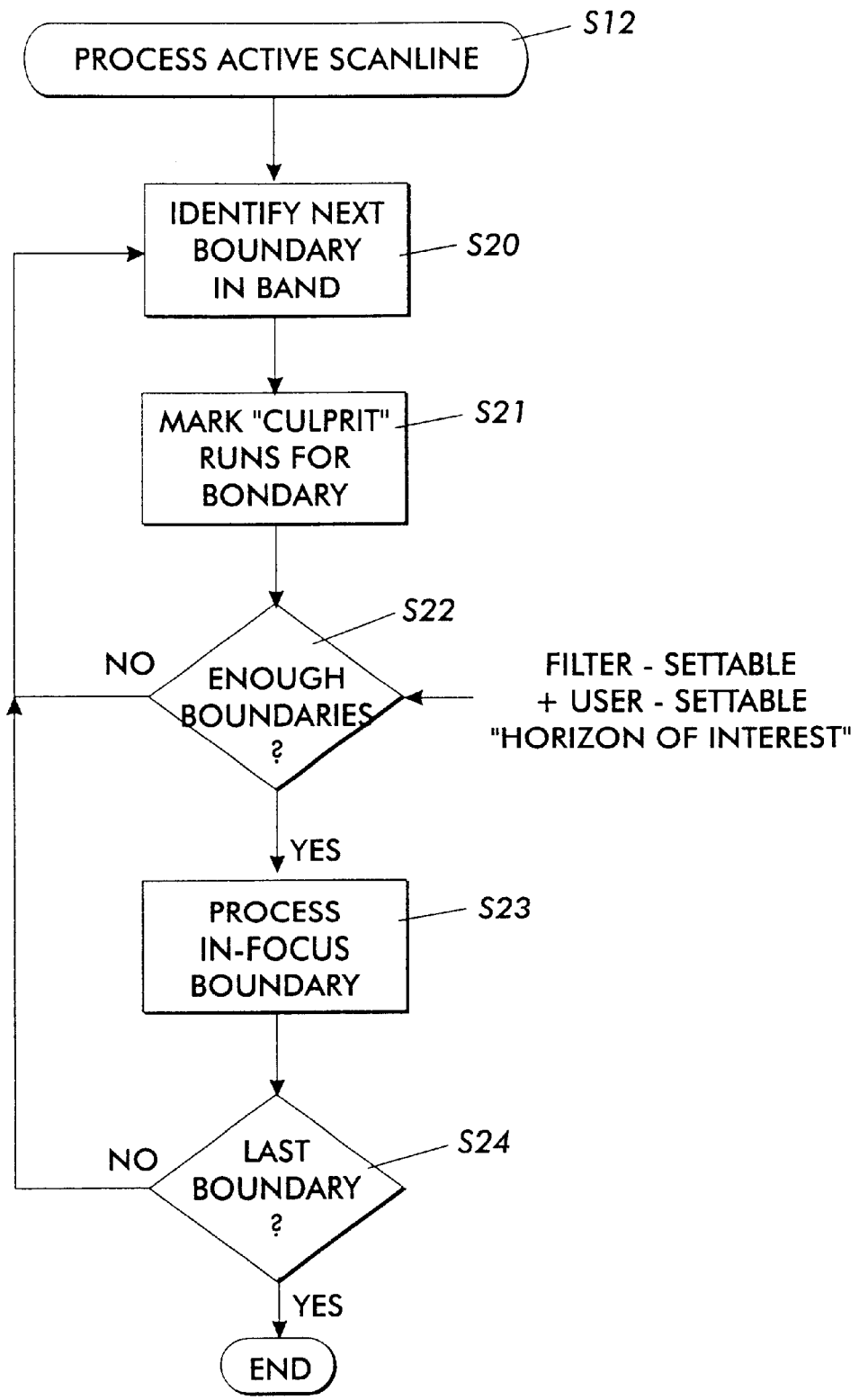
FIG. 6 shows the steps used in the invention to process the "active scanline" of the collected band of scanlines.

The following steps are taken to process an active scanline, as shown in FIG. 6:

In step S20, each "boundary" is identified, where a boundary is a section of the band in the S direction within which there are no attribute changes (color, type, hint, etc.) in any of the band's scanlines. Starting at the beginning of the band (S=0), find the point at which a run ends on ANY of the scanlines in the band. This is the first boundary. Starting at that point, find the next point where a run ends on any of the scanlines. This is the next boundary. The actual process uses a priority queue of all the runs in the band based on their starting position in the S ("Scan") direction. By maintaining the priority queue, the next run on any of the band's scanlines is known, so the boundaries are quickly identified.

Figure 7:
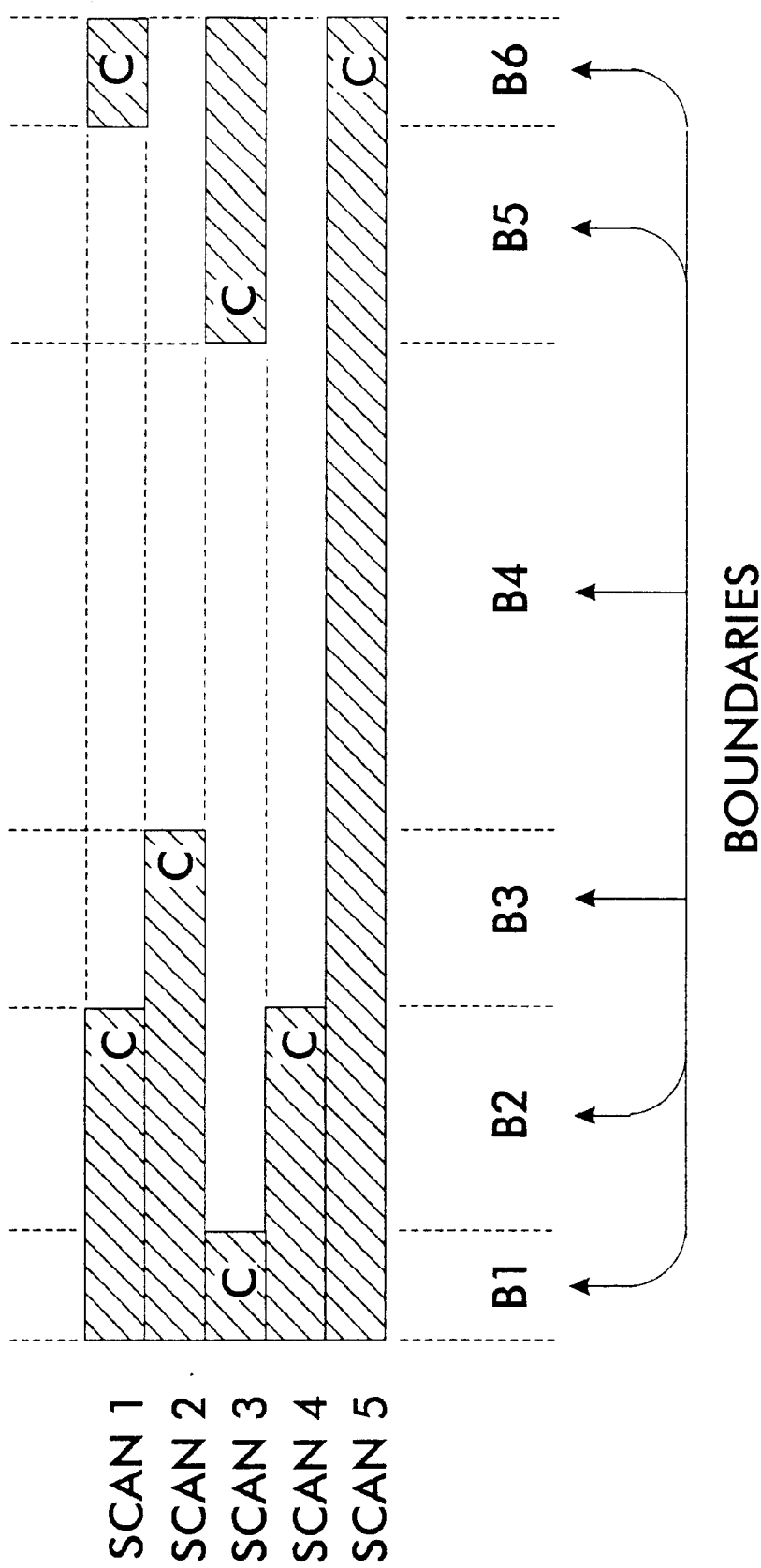
FIG. 7 shows a band of runs collected by the current invention, with "boundaries" in the band of runs identified for further processing in the invention. Boundaries are regions in the band ended by a change on any of the scanlines of the band.

An example of boundaries is shown in FIG. 7, where scans Scan1–Scan5 have been collected, and boundaries B1–B6 are identified as the places in the band where a run ends on ANY of the scanlines.

The data included for each boundary is simply a pointer to each scanline's run at that point, and the "culprit" run is marked in step S21. The "culprit" run is the run whose ending caused the ending of the boundary. In FIG. 7, the culprit runs are marked with a "C". If several runs end simultaneously, the ending run nearest in the P direction to the active scanline can be marked as the "culprit" run. Alternatively, all "culprit" runs can be marked so that the downstream software can decide which is most important, either by distance or by attribute difference.

In step S22, a check is made to see if enough boundaries have been collected and stored to cover the horizon of interest which was set for the S direction. This S-Horizon is the distance in the S direction within which it was determined by the user or the filters that adjacencies might cause problems. This collection of consecutive boundaries is called a "boundary set".

Within a boundary set, there is one "in-focus" boundary; and on both sides of it, out to the S-Horizon on each side, are the rest of the boundaries. The in-focus boundary contains an "active run", which is the run in the in-focus boundary that is on the active scanline (the scanline currently being processed). In step S23 the active run of the infocus boundary is processed, as described in further detail below. In step S24, if this is the last "in-focus boundary in the boundary set, the process ends; otherwise, control returns to step S20 for continued processing.

Processing the In-Focus Boundary within a Boundary Set:

The bands filter, as described previously, has collected scanlines, organized them into boundary sets, identified "culprit" runs causing each boundary, chosen each active scanline to process, and within that active scanline chosen each in-focus boundary to process in turn. The processing of each in-focus boundary proceeds as shown in FIG. 8.

Downstream from the bands filter are one or more filters, each of which is normally focused on predicting and pre-compensating for one particular printing defect (filters may be combined, of course). These filters are shown as F1, F2, F3, and F-n in FIG. 8. One filter (F1) might look for trail-edge deletion, described earlier as a color deletion at an edge of sufficient size in both directions. Another filter (F2) might focus, as mentioned earlier, on adjacencies of rendering intent or object type which would lead to visible artifacts at the boundary between two halftones. Another (F3) might be focused on the problem of predicting color adjacencies which might cause misregistration artifacts. Many filters are possible, depending on the particular edge defects of a particular printing system. For example, a filter might look for starvation effects, in which a leading edge in the Process direction of sufficient width in the Scan direction is followed by a sufficiently large fill of uniform color. In this case, some printing systems will show color deletion at the leading edge which can be pre-compensated for. Still another filter might look for situations in the runs which lead to "haloing", in which a group of runs of certain colors completely surrounded by a group of runs of different color might lead to the surrounding color being lightened. Extra filters such as these examples are grouped in FIG. 8 as F-n.

Each printing system might exhibit different defects to a greater or lesser extent. However, the invention specifies that each filter for each printing defect must accomplish two tasks: first, to recognize the conditions in the boundaries surrounding each in-focus boundary that will trigger its specific printing defect, and second, to be able to apply a function that changes the attributes of the affected runs as a function of the distance of each run to the "active run" of the in-focus boundary. The "active run", again, is the run in the in-focus boundary that is on the current "active scanline".

Figure 8:
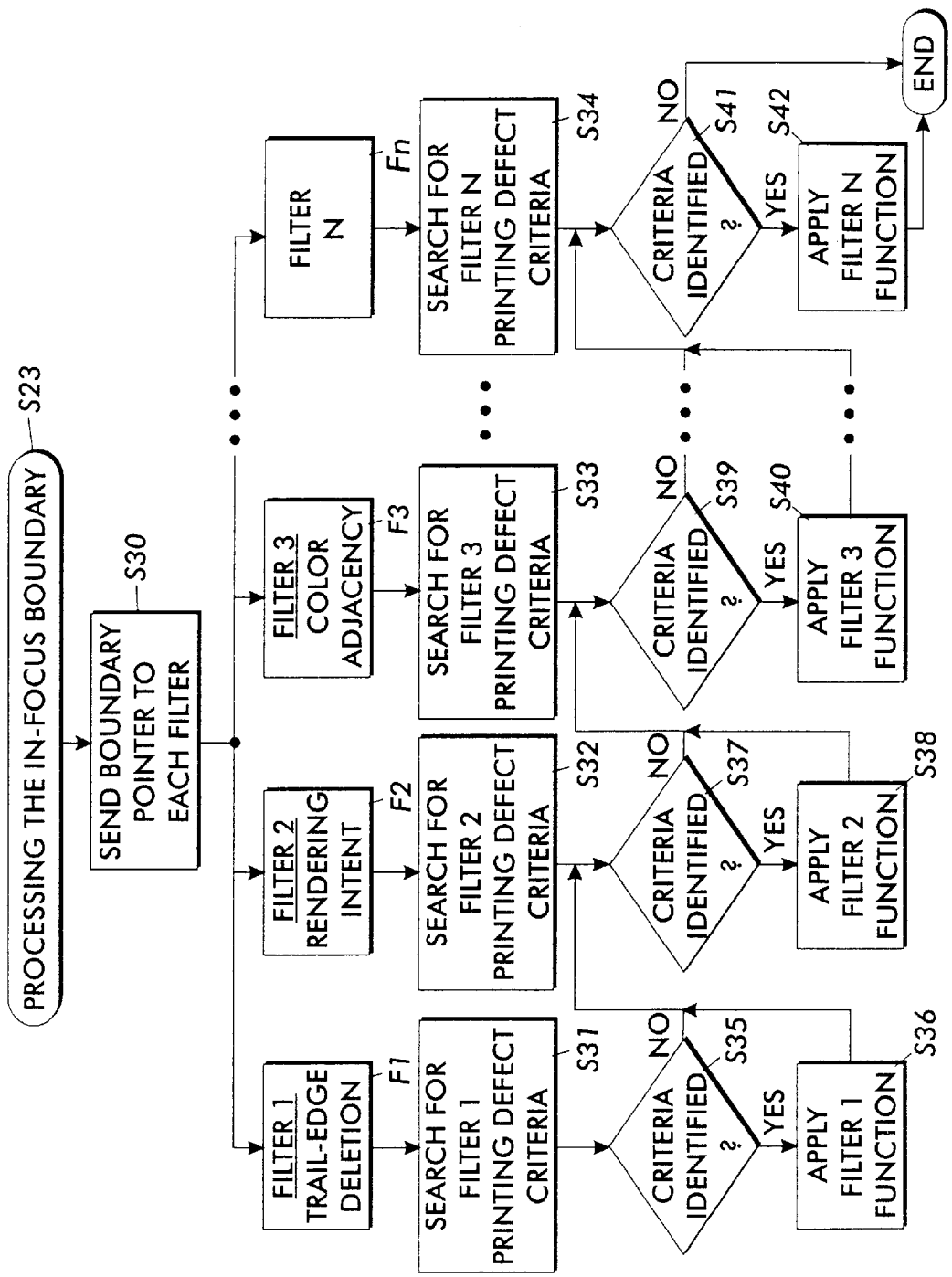
FIG. 8 shows processing steps by which an in-focus boundary is processed in the current invention, wherein criteria which predict certain printing problems are found and functions are applied to change the run attributes and mask or eliminate the problem.

Continuing with FIG. 8, in order to process an in-focus boundary, in step S30 a pointer to the boundary set is passed to each of the filters F1–Fn that is registered with the bands filter as looking for printer defects. In steps S31–S34, each filter searches the boundary set with the in-focus boundary as the center of focus in order to determine if the criteria for its particular printing defect have been met.

As a first example, a trail-edge deletion filter F1 looks in step S31 for runs above the active run which have the same attributes (color, tag, etc.) and which extend to its horizon of interest in both the S and P directions (sufficiently high and wide to cause the trail-edge deletion problem), with a run below the active run that has different color than the active run (i.e., the active run is a lower edge).

As a second example, a rendering intent filter F2 which is looking for different rendering intents (e.g., one run's tag says "preserve edges" vs another which says "preserve color values"—often resulting in two different halftones used) must look in step S32 all around the active run to find possible adjacent runs that might cause problems. It looks in the P (Process) direction above and below, and in the S (Scan) direction to each side, and diagonally from the in-focus boundary's corners, in an effort to find among all the adjacent boundaries any rendering tag attribute which might cause a quality problem when printed near the active run. The search for adjacencies can be prioritized by P-direction first or by S-direction first. (S direction also includes all runs diagonally adjacent). The search for adjacencies proceeds beginning with the runs nearest the active run and proceeding outward until the specified "horizon" is reached. If the horizon is reached before a specified number of adjacencies is reached, the search continues in the other direction. For example, if P-first priority is specified, searching begins in the in-focus boundary with the scanline just above the active run (inFocus.P−1). If it is no different in rendering intent than in-focus, the boundary just below is examined (inFocus.P+1). If it also is not different, inFocus.P−2 is tried, followed by inFocus.P+2 until horizon.P is reached in both directions. If the specified number of adjacencies has not yet been found, searching proceeds in the negative and positive S directions. Searching in the S directions has many more possible boundary runs to consider, since the diagonals are included in this group. To limit this search is the reason the "culprit" runs are marked for each boundary; since these are the run which caused each boundary to end, only the culprit runs are examined during the search in the S direction to see if their color presents a problem to the in-focus boundary's color.

In the above two examples, the criteria sought by each filter is different, but the result of steps S31–S34 of searching the boundary set using the in-focus boundary as the center of the search for particular printing defect criteria is the same. Each filter reports, in steps S35, S37, S39, and S41 whether criteria have been identified around the in-focus boundary that would lead to a prediction of each filter's particular printing defect.

For each filter, a second step of changing the affected runs to pre-compensate for its particular printing problem is taken by each filter that reported finding criteria that indicate a printing problem (with user-settable priority of filters). To accomplish changing the runs so as to pre-compensate for a problem, each filter has a defined "Function Applier" which applies a pre-defined function to the relevant adjacent runs to change their relevant attributes as a function of distance from the active run. Each "Function Applier" is called with the in-focus boundary and the list of adjacencies as parameters. Each adjacency has the following data: the start distance (vector distance from the in-focus boundary), end distance (vector distance beyond the start within which the adjacency remains constant) and run information (color, object hint, etc). Recall also that each adjacency was chosen because it was determined by some filter that it differs in some (user-definable) significant way from the in-focus boundary. The function being applied is generally based on any or all of: the in-focus color, in-focus hint, adjacency color, adjacency hint, adjacency start distance and adjacency end distance.

As a first example, in step S36 the Function Applier for the trail-edge deletion filter is applied if trail-edge deletion criteria is discovered in step S35. The function applied will in this case increase the color density of runs as they approach the active run (which is at the edge). This will counteract the expected decrease of density caused by the trail-edge deletion problem. The actual amounts of increase of each run are derived experimentally for each printer.

Once the function is applied in step S36, or if in step S35 no criteria for a trail-edge deletion problem was found, control passes to step S37, where it is determined if criteria was found predicting a printing problem from adjacent runs having incompatible rendering intents.

If rendering intent problems were found in step S37, the Function Applier for the rendering intent filter will in step S38 add to each affected run a "transition" rendering hint with a parameter of distance from the active run so that later processing of the run will include information that a transition in rendering intent is approaching. Then, if it becomes necessary to provide a buffer zone between two rendering intents to smooth the transition, the information is available to allow the system to do so. In order to add such a hint in the S-direction, three prototype new runs are initialized, called "pre," "main" and "post." "Pre" will be used in case the hint has to be added in the minus-S direction, "post" is used to modify the edge of the in-focus boundary in the plus-S direction. "Main" is initialized to be identical with the active run; "pre" and "post" are also but initially have length 0. Modifications to edges to alleviate printer defects in the P direction are accomplished by modifying "main's" hint.

Once the function is applied in step S38, or if in step S37 no criteria for a rendering intent problem was found, control passes to step S39, where it is determined if criteria was found predicting a printing problem from adjacent runs having incompatible colors. If so, the function to pre-compensate for that problem is applied in step S40 and control passes down the filter chain eventually to the final registered filter F-n. If not, the function is not applied in step S40, and control passes in like manner down the filter chain eventually to the final registered filter F-n.

By having available so much object information for each run, and by allowing a flexible structure which can handle virtually any edge-related printing problem, a wide range of printer problems can potentially be detected, and the functions for modifying run attributes can be applied in a flexible, object-optimized basis to achieve higher-quality printing.

While the above is a complete description of a preferred embodiment of the invention, various alternatives, modifications, and equivalents are possible. Therefore, the above description does not limit the scope of the present invention. The appended claims define the scope of the invention.

What is claimed is:

1. A method of printing to a printer with a known potential printing defect by processing digital data which specifies attributes for points on a page, said attributes including at least one of color value and rendering intent, including the steps of:

detecting a pattern in said data which is predicted to cause said printing defect, said pattern including an edge between at least two pixels with different said attributes, applying a function to change at least one attribute of at least one of said pixels, said function including a distance of said pixel from said edge, and sending said changed pattern to said printer for printing.

2. The method of claim 1 wherein said printing defect occurs to a different degree in each of at least two directions on the page, and wherein said applied function additionally includes a direction of said pixel from said edge.

3. The method of claim 1 wherein said attribute additionally includes a number of adjoining similar pixels in at least one direction.

4. The method of claim 1 wherein said attributes additionally include an object type.

5. The method of claim 2 wherein said at least two directions include a scan direction which is the direction a printing mechanism of said printer scans across a page, and a process direction which is the direction a printing process of said printer moves down the page.

6. The method of claim 1 wherein said potential printing defect is misregistration in which said edge comprises two pixels with different colors that if printed misaligned show a potential color change, and wherein the step of applying a function changes the color of at least one of said two pixels such that said potential color change is less visible.

7. The method of claim 1 wherein said edge comprises at least two pixels of first color followed by a pixel of second color, and wherein said potential printing defect is trail-edge deletion in which at least one of said two pixels of first color is potentially misprinted with a color lighter than said first color, and wherein the step of applying a function changes the color of said potentially lightened pixel as a function of distance from said edge such that said potentially lightened pixel is actually printed with a color closer to said first color.

8. The method of claim 1 wherein said edge comprises at least one pixel of first color followed by at least two pixels of second color, and wherein said potential printing defect is starvation or lead-edge deletion in which at least one of said two pixels of second color is potentially misprinted with a color lighter than said second color, and wherein the step of applying a function changes the color of said potentially lightened pixel as a function of distance from said edge such that said potentially lightened pixel is actually printed with a color closer to said second color.

9. The method of claim 1 wherein said potential printing defect is rendering intent incompatibility in which said edge has two pixels with different rendering intents which potentially cause visible defects when adjacent, wherein the step of applying a function changes the rendering intent of at least one of said two pixels such that said visible defect is less visible.

10. The method of claim 1 wherein said edge comprises at least one pixel of first color surrounded by pixels of at least a second color, and said potential printing defect is halo in which said surrounding pixels are potentially printed with a color lighter than said at least second color, wherein the step of applying a function changes a color of said potentially lightened pixels as a function of distance from said pixel of first color such that said potentially lightened pixels are actually printed with a color closer to said at least second color.

11. A method of processing images for printing including the steps of receiving a page description language containing instructions giving at least one of location, shape, color, and attributes of objects on a page, collecting, for a scanline on said page, at least two runs which define said objects on said scanline, wherein said collected runs comprise a collection of adjacent pixels with similar attributes and include at least one of a length, a color, an object identifier, an object parameter, and a rendering intent, sending said runs to at least one filter which can modify said runs, and printing said modified runs.

12. The method of claim 11 additionally including the step of flattening said two runs by choosing an on-top run for each point in said scanline before sending said runs to said filter.

* * * * *